United States Patent
Serguieva et al.

(10) Patent No.: US 12,506,602 B2
(45) Date of Patent: Dec. 23, 2025

(54) BIO-EXTRACTED SEED

(71) Applicant: nChain Licensing AG, Zug (CH)

(72) Inventors: Antoaneta Serguieva, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 203 days.

(21) Appl. No.: 18/022,737

(22) PCT Filed: Jul. 26, 2021

(86) PCT No.: PCT/EP2021/070790
§ 371 (c)(1),
(2) Date: Feb. 22, 2023

(87) PCT Pub. No.: WO2022/042969
PCT Pub. Date: Mar. 3, 2022

(65) Prior Publication Data
US 2023/0224149 A1    Jul. 13, 2023

(30) Foreign Application Priority Data
Aug. 24, 2020 (GB) .................................. 2013172

(51) Int. Cl.
*H04L 9/08* (2006.01)
*H04L 9/32* (2006.01)

(52) U.S. Cl.
CPC .......... *H04L 9/0866* (2013.01); *H04L 9/0869* (2013.01); *H04L 9/3231* (2013.01)

(58) Field of Classification Search
CPC .... H04L 9/0866; H04L 9/0869; H04L 9/3231
See application file for complete search history.

(56) References Cited

U.S. PATENT DOCUMENTS

| | | |
|---|---|---|
| 6,363,485 B1 | 3/2002 | Adams et al. |
| 10,396,985 B1 | 8/2019 | Nagelberg et al. |
| (Continued) | | |

FOREIGN PATENT DOCUMENTS

| | | |
|---|---|---|
| CN | 105812126 A | 7/2016 |
| CN | 109658078 A | 4/2019 |
| (Continued) | | |

OTHER PUBLICATIONS

M. Hirschbichler, C. Boyd and W. Boles, "A Multiple-Control Fuzzy Vault," 2008 Sixth Annual Conference on Privacy, Security and Trust, Fredericton, Canada, 2008, pp. 36-47, doi: 10.1109/PST.2008.23. (Year: 2008).*

(Continued)

*Primary Examiner* — Kostas J Katsikis
(74) *Attorney, Agent, or Firm* — Messner Reeves LLP

(57) ABSTRACT

A computer-implemented method of generating a seed for deriving one or more private keys, wherein the method comprises: obtaining one or more biometric readings; and for each of the one or more biometric readings: identifying a plurality of biometric features; generating a plurality of respective first binary representations, wherein at least some of the first binary representations are generated based on respective sets of the plurality of biometric features, and wherein the first binary representations preserves physical differences between the biometric features; and generating a respective second binary representation, each respective second binary representation being generated based on the respective first binary representations; wherein the method further comprises generating a seed based on the respective second binary representations.

18 Claims, 7 Drawing Sheets

(56) References Cited

U.S. PATENT DOCUMENTS

| | | | |
|---|---|---|---|
| 2009/0310779 | A1 | 12/2009 | Lam et al. |
| 2011/0258460 | A1 | 10/2011 | Pizano et al. |
| 2015/0095654 | A1 | 4/2015 | Li et al. |
| 2017/0300739 | A1 | 10/2017 | Suwald et al. |
| 2019/0130082 | A1* | 5/2019 | Alameh ............ G06F 21/6218 |
| 2019/0163890 | A1 | 5/2019 | Cho et al. |
| 2019/0280864 | A1 | 9/2019 | Cheng et al. |
| 2019/0356491 | A1 | 11/2019 | Herder, III et al. |
| 2020/0259638 | A1* | 8/2020 | Carmignani ............ H04L 9/085 |
| 2021/0326490 | A1* | 10/2021 | Zalivaka ............ G06F 11/1068 |
| 2021/0398134 | A1* | 12/2021 | Dumas ............... G06Q 20/3674 |
| 2025/0132905 | A1* | 4/2025 | Osborn ................ H04L 9/0894 |

FOREIGN PATENT DOCUMENTS

| | | |
|---|---|---|
| CN | 111222880 A | 6/2020 |
| JP | 2001144743 A | 5/2001 |
| JP | 2001168854 A | 6/2001 |
| JP | 2009026235 A | 2/2009 |
| JP | 2010176370 A | 8/2010 |
| JP | 2013027011 A | 2/2013 |
| WO | 2007113888 A1 | 10/2007 |

OTHER PUBLICATIONS

Combined Search and Examination Report for Great Britain Application No. 2013172.8, dated Jan. 7, 2021, 6 pages.

Combined Search and Examination Report under Sections 17 and 18(3) for Application No. GB2013173.6, mailed on May 26, 2021, 10 pages.

Dewar M., et al., "Ordering Block Designs: Gray Codes, Universal Cycles and Configuration Orderings," CMS Books in Mathematics, Springer, 2012, 219 pages.

D'Cent, "The Most Advances Cryptocurrency Hardware Wallet," D'Cent Wallet, IoTrust, retrieved from the Internet: URL: https://dcentwallet.com/products/BiometricWallet, Mar. 9, 2020, 8 pages.

Hirschbichler M., et al., "A Multiple-Control Fuzzy Vault," Sixth Annual Conference on Privacy, Security and Trust, 2008, pp. 36-47.

International Search Report and Written Opinion for International Application No. PCT/EP2021/070794, mailed on Oct. 29, 2021, 14 pages.

International Search report and Written Opinion issued in International Application No. PCT/EP2021/070790, mailed on Oct. 26, 2021, 14 pages.

Jin Z., et al., "Fingerprint Template Protection with Minutiae-Based Bit-String for Security and Privacy Preserving," Expert Systems with Applications, May 2012, vol. 39 (6), pp. 6157-6167.

Kho J.B., et al., "Cancelable Fingerprint Template Design with Randomized Non-Negative Least Squares," Pattern Recognition, Jul. 2019, vol. 91, pp. 245-260.

Li C., et al., "A Security-Enhanced Alignment-Free Fuzzy Vault-Based Fingerprint Cryptosystem Using Pair-Polar Minutiae Structures," IEEE Transactions on Information Forensics and Security, Mar. 2016, vol. 11, No. 3, pp. 543-555.

Lin S., et al., "Error Control Coding: Fundamentals and Applications," Prentice-Hall Computer Applications in Electrical Engineering Series, 2nd edition, 2005, 624 pages.

Liu F., et al., "Fingerprint Pore Matching Using Deep Features," Pattern Recognition, Jun. 2020, vol. 102, 7 pages.

Moon T.K., "Error Correction Coding: Mathematical Methods and Algorithms," Wiley Interscience, 2005, 39 pages.

Murakami T., et al., "Optimal Sequential Fusion for Multibiometric Cryptosystems," Information Fusion, Feb. 2016, vol. 32, 51 pages.

Palatinus M., et al., "BIP 39: Mnemonic Code for Generating Deterministic Keys," Github Bitcoin BIPs, Sep. 10, 2013, 4 pages.

Ratha N. K., "Generating Cancelable Fingerprint Templates," IEEE Transactions on Pattern Analysis and Machine Intelligence, 2007, vol. 29, No. 4, pp. 561-572.

Sarier N. D., et al., "Privacy Preserving Biometric Identification on the Bitcoin Blockchain," International Conference on Image Analysis and Processing, 2018, pp. 254-269.

Shi S., et al., "Fingerprint Recognition Strategies Based on a Fuzzy Commitment for Cloud-Assisted IoT: A Minutiae-Based Sector Coding Approach," IEEE Access, Mar. 19, 2019, vol. 7, pp. 44803-44812.

Tams B., et al., "Security Considerations in Minutiae-Based Fuzzy Vaults," IEEE Transactions on Information Forensics and Security, May 2015, vol. 10 (5), 3 pages.

Thakkar D., "Minutiae Based Extraction in Fingerprint Recognition," Biometric Terminology Rubrics, Biometric Solutions, Oct. 21, 2016, retrieved from the Internet: https://www.bayometric.com/minutiae-based-extraction-fingerprint-recognition/, on Aug. 24, 2020, 7 pages.

Trezor, "Hierarchical Deterministic Wallet," Trezor Wiki rubrics, retrieved from the Internet: URL: https://trezor.io/learn/a/what-is-a-hardware-wallet, on Aug. 24, 2020, 2 pages.

US National Forensic Science Technology Center (NFSTC), "A Simplified Guide to Crime Scene Investigation," NFSTC, 2013, 20 pages.

U.S. National Institute of Standards and Technology, "Minutiae Interoperability Exchange (MINEX) III," NIST, Jun. 2020, retrieved from the Internet: https://www.nist.gov/itl/iad/image-group/minutiae-interoperability-exchange-minex-iii, on Aug. 24, 2020, 3 pages.

U.S. National Institute of Standards and Technology, "Proprietary Fingerprint Template III," Test Plan and Application Programming Interface, updated on Dec. 2019, 20 pages.

Voegtlin T., "Electrum Documentation," Release 3.3, Aug. 15, 2022, GUI and beginners, 93 pages.

Wong W.J., et al., "A Security- and Privacy-Driven Hybrid Biometric Template Protection Technique," International Conference on Electronics, Information and Communications (ICEIC), IEEE, Jan. 15, 2014, 5 pages.

Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.

Yau W., "Fingerprint Templates," in Li S., and Jain A K., Encyclopedia of Biometrics, vol. 1, Springer, 2009, 1466 pages.

Shibata Y., et al., "Key Generation from Multiple Biometric Features Using Statistical A/D Conversion with Error Correction", Information Processing Society of Japan Journal, Japan, Information Processing Society of Japan, Sep. 15, 2007, vol. 48, No. 9, pp. 3027-3038.

Zhao H., et al., "Lightweight Backup and Efficient Recovery Scheme for Health Blockchain Keys," 2017 IEEE 13th International Symposium on Autonomous Decentralized Systems, 2017, pp. 229-234.

\* cited by examiner

BIO-EXTRACTED SEED

CROSS REFERENCE TO RELATED APPLICATIONS

This application is the U.S. National Stage of International Application No. PCT/EP2021/070790 filed on Jul. 26, 2021, which claims the benefit of United Kingdom Patent Application No. 2013172.8, filed on Aug. 24, 2020, the contents of which are incorporated herein by reference in their entireties.

TECHNICAL FIELD

The present disclosure relates to a method of generating a seed (i.e. a secret value) that can be used to derive one or more private keys.

BACKGROUND

Public-key cryptography is a type of cryptographic system that uses pairs of keys: private keys which are known only to the owner of the private key, and public keys which are generated based on the corresponding private key and which may be disseminated without compromising the security of the private key. Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature on the message. Anyone with the signer's corresponding public key can use the same message and the digital signature on the message to verify whether the signature was validly created, i.e. whether the signature was indeed made using the signer's private key.

A private key is normally generated using a "seed". A seed refers to secret data that is known only to the owner(s) of the private keys that are to be generated by that seed. One or more private keys are generated as a function of the seed. For instance, a hash function may be applied to the seed to generate a private key, sometimes referred to as a "master private key". As well as generating private keys for the first time, the same seed can be used to re-generate, i.e. reconstruct, those same private keys. For instance, if a user loses their private key(s), those private keys can be reconstructed so long as the seed is still known to the user.

One particular field that makes use of public-key cryptography is blockchain technology. As well as encrypting messages (e.g. data stored in a transaction output), public keys are also used to "lock", or assign, an output to an owner of a private key corresponding to a given public key. In that case, only the owner of the private key can "unlock" the output. Further details on the use of public-key cryptography in the context of the blockchain are provided below.

SUMMARY

One common standard for managing private keys for use on the blockchain is hierarchical deterministic (HD) key management. For example, in Bitcoin Improvement Proposal (BIP) 32, a hierarchical key tree is derived from a single source of entropy using a deterministic public algorithm. The first step in the algorithm is generating the seed. The seed is generated as a random bit-sequence (recommended 256 bits) from a pseudo-random number generator (PRNG). HD key management efficiently resolves the bag-of-keys problem. The remaining challenge is that the user has to remember and/or write down and keep safe the seed, and communicate it when the private keys (sometimes referred to as a "wallet", i.e. a wallet of keys) has to be reconstructed or shared. Humans are predisposed to failing in these tasks when the seed is a raw bit-sequence.

That challenge was addressed in BIP39. A system was proposed for abstracting into a mnemonic phrase the entropy required for the master key. A mnemonic phrase is easier to manipulate, and is more user-friendly than the raw seed. A remaining challenge is that security and usability are conflicting objectives. Wallet security increases with increasing seed entropy. This, in turn, increases the number of random words in the mnemonic phrase to the extent that it is increasingly difficult or infeasible to memorize. Balancing this challenge, BIP39 indicated an "allowed size of entropy" in the range of 128-256 bits and suggested a dictionary of $2^{11}$ words. That provided for a phrase length of up to 24 words.

Therefore, the remaining challenge consists of simultaneously achieving the following. On the one hand, generating a seed that is not necessary to memorise and is user-friendly to reproduce. On the other hand, generating a seed without restrictions on the size of entropy.

It would therefore be desirable to overcome either challenge, or even more desirable to achieve the dual objective of overcoming both challenges at the same time. Similar considerations may apply to other types of hierarchal domain wallets, or more generally any scheme for generating a seed from which keys are derived.

According to one aspect disclosed herein, there is provided a computer-implemented method of generating a seed for deriving one or more private keys, wherein the method comprises: obtaining one or more biometric readings; and for each of the one or more biometric readings: identifying a plurality of biometric features; generating a plurality of respective first binary representations, wherein at least some of the first binary representations are generated based on respective sets of the plurality of biometric features, and wherein the first binary representations preserves physical differences between the biometric features; and generating a respective second binary representation, each respective second binary representation being generated based on the respective first binary representations; wherein the method further comprises generating a seed based on the respective second binary representations.

A bio-extracted seed is produced by translating minutia biometric features into a binary string of sufficient entropy. The minutia features in at least one reading from a user are identified, or "observed", e.g. by a pattern recognition algorithm. The reading may include a liveness detection in order to avoid presentation attacks. The seed can be later reconstructed in response to another biometric reading from the same user, where the later reading may also include liveness detection. Minutia features from more than one biometric characteristic can be used when generating a seed for the same user, e.g. two fingerprints or a fingerprint and an iris, etc. Then both the construction of the seed and its reconstruction are based on multiple readings. When considering a seed for a shared HD wallet between different users, then a biometric reading is used from each user both at the seed construction and the seed reconstruction stages.

As the seed is constructed and reconstructed using a user's (or users') biometric characteristic(s), the user(s)

is/are not required to memorise or store the seed. The present technique is therefore not only more user-friendly, but also more secure than conventional techniques since the seed cannot be lost or stolen. Furthermore, given the uniqueness of a user's biometric characteristics, e.g. fingerprints, the seed can be said to be generated from a truly random source. Thus the dual-objective is met by the present invention.

Furthermore, generating and reconstructing shared wallets in a usable and secure way is still a challenge under the current BIP37 and BIP39 protocols. Therefore, the proposed methodology additionally provides for easily generating and reconstructing shared wallets. This can be considered as the third achieved objective of the present invention when the biometric readings are provided by different users.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
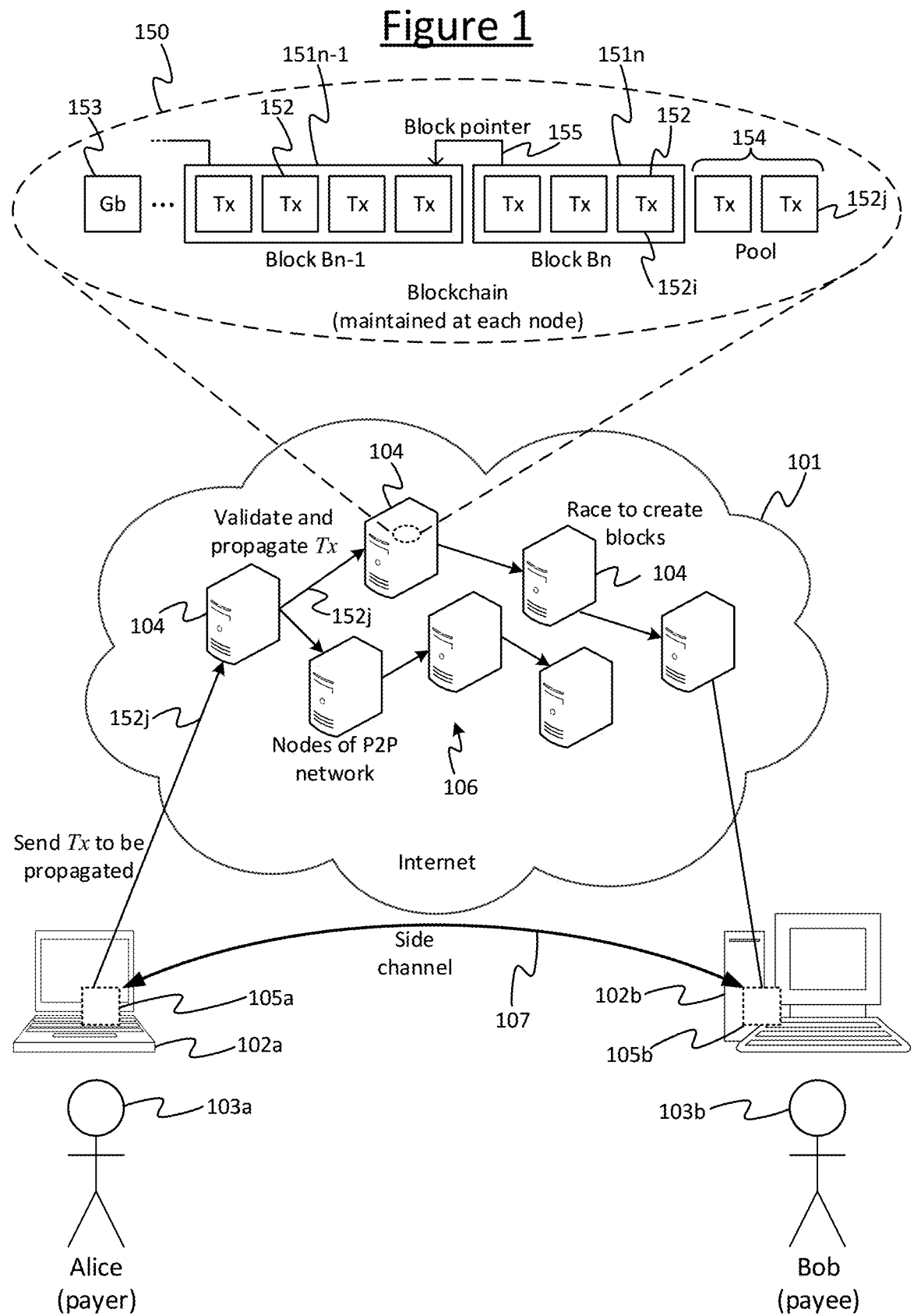
FIG. 1 is a schematic block diagram of a system for implementing a blockchain.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This optional field may point back to a previous transaction, for example if the previous transaction ID is included in the data field.

UTXO-Based Model

Figure 2:
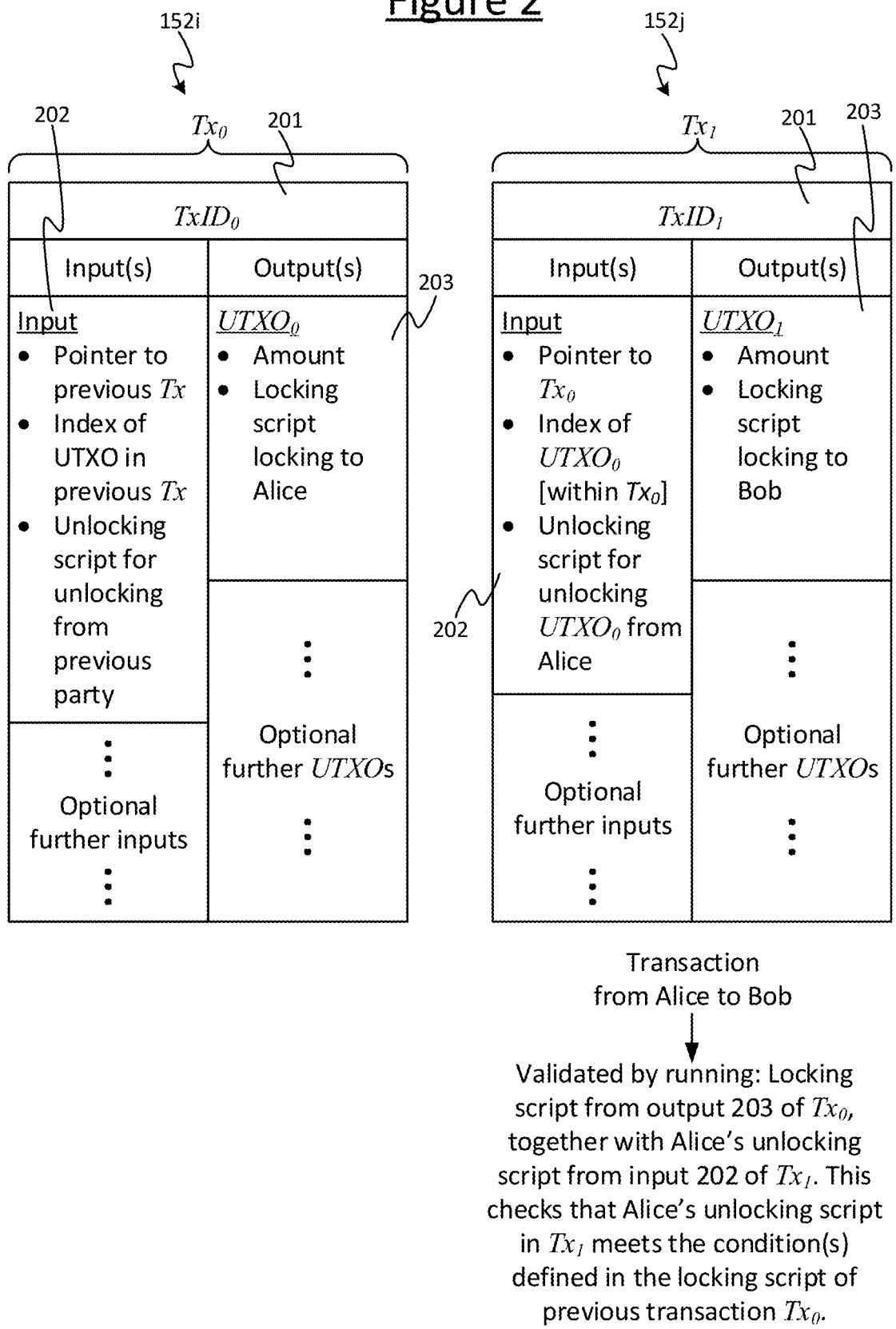
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>‖[Checksig $P_A$]

where "‖" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

BIP Preliminaries

The following describes properties of some BIP protocols as examples of algorithms for generating keys and deriving keys. In embodiments the presently disclosed schemes may apply as an improvement to a BIP protocol, but it will be appreciated that more generally the disclosed schemes may be applicable to any type of algorithm for generating a seed from which keys are derived.

Seed Generation

In BIP32, the seed S is generated as a raw bit-sequence from a PRNG. The bit-size of such a seed is equal to the size of entropy the seed provides for deriving the master key. The recommended size is 256 bits. The user is required to write down and keep safe the raw seed S, and communicate it when the wallet has to be recovered or shared. Humans are predisposed to failing in these tasks when directly manipulating a binary string.

In BIP39, a raw bit-sequence is generated from a PRNG initially, and the indicated range of "allowed size of entropy" is 128-256 bits. Then, a dictionary comprising $2048=2^{11}$ words is suggested, where each word corresponds to a different 11-bit binary value. The initial entropy is translated next into a mnemonic phrase consisting of up to 24 words. In order to distinguish between the initially produced raw seed and the mnemonic phrase below, they are denoted with S and $S_W$, respectively. In order to translate S into $S_W$, S is first divided into 11-bit substrings. A checksum is appended to the last substring to reach 11-bit length. Each substring is substituted with a corresponding word from the dictionary, and S is presented as the sequence of these words.

The relation between the length of $S_W$ in words and the bit-size of S is shown in the table below.

| bit-size of S (+checksum) | word-length of $S_W$ |
|---|---|
| 128 (+4) | 12 |
| 192 (+6) | 18 |
| 256 (+8) | 24 |

Communicating a random sequence of words is more user-friendly than communicating a binary string. A remaining challenge is that security and usability are conflicting objectives. Wallet security increases with increasing seed entropy. This, in turn, increases the length of the mnemonic phrase to the extent that it is increasingly difficult or infeasible to memorize. Balancing this challenge, BIP39 imposes a cap on allowed entropy.

Role of Seed in Key-Tree Derivation

The generated seed S provides the entropy needed in deriving the master private key $sk_{master}$. This derivation follows Algorithm 1, as described in BIP32.

Algorithm 1. Master key derivation
Calculate I=HMAC_SHA512(Key="Bitcoin seed", Data=S)
Split I into two 32-byte sequences: $I_L$ and $I_R$.
Use parse256($I_L$) to interpret the left 32-byte sequence as a 256-bit number
(most significant byte first). This number is the master secret key $sk_{master}$
Use parse256($I_R$) to interpret the right 32-byte sequence as a 256-bit number.
This is the master chain code $c_{master}$.
In case $sk_{master}$=0 or ≥n, then $sk_{master}$ is invalid and a new seed S is generated.

The master private key and chain code $sk_{master}$ and $c_{master}$, with the entropy embedded in them from the seed S, are next used for deriving the rest of the key tree. In Algorithm 2, $sk_{master}$ and $c_{master}$ are the first parent key and chain code $sk_{parent}$ and $c_{parent}$. Then, in a chain of key derivations, parents produce children, and children in turn become parents. A child private key $sk_{child,i}$ and a chain code $c_{child,i}$ are derived as follows.

Algorithm 2. Key tree derivation: hardened and non-hardened child keys
If the key index $i \geq 2^{31}$, the child is a hardened key and derived from:

$$I=HMAC\_SHA512(Key=c_{parent}, Data=0\text{x}00\|ser_{256}(sk_{par})\|ser_{32}(i)),$$

where $ser_{256}(sk_{parent})$ serializes integer $sk_{parent}$ into a 32-byte sequence (most significant byte first). Also, $ser_{32}(i)$ serializes the 32-bit unsigned integer i into a 4-byte sequence, and 0x00 pads $ser_{256}(sk_{par})$ to a length of 33 bytes.
If the key index $i<2^{31}$, the child is a non-hardened key and derived from:

$$I=HMAC\_SHA512(Key=c_{parent}, Data=ser_p(sk_{parent} \cdot G)\|ser_{32}(i)),$$

where $ser_p(sk_{parent} \cdot G)$ serializes point coordinates $sk_{parent} \cdot G=(x,y)$ into a compressed-form byte sequence (0x02 or 0x03)$\|ser_{256}(x)$, where the header byte depends on the sign of the omitted y-coordinate.
Split I into two 32-byte sequences: $I_L$ and $I_R$.
Return child-key $sk_{child,i}$=parse256($I_L$)+$sk_{parent}$ (mod n) where n=
Return child chain code $c_{child,i}=I_R$
In case parse256($I_L$) n or $sk_{child,i}$=0, then $sk_{child,i}$ is invalid and the algorithm continues with the next value for i. (the probability for this is $\leq 2^{-127}$).

Bio-Extracted Seed

Embodiments of the present invention enable a seed to be generated based on biometric data. For instance, the seed may be generated based on a user's fingerprint. That is, biometric information is extracted from the fingerprint during a reading including a liveness detection, and used to generate a seed. The seed is therefore uniquely linked to the user's biometric data. The same seed may then be reconstructed at a later time based on another reading/scanning of the user's fingerprint that includes liveness detection. As will be discussed below, the seed may also be generated based on multiple biometric readings, e.g. of the same or different types, and/or of the same or different users.

For the sake of brevity, embodiments of the present invention will be described with reference to Alice 103a as described above. That is, the embodiments of the present invention may be performed by Alice 103a. Note that this does not mean that the embodiments can only be performed by a user such as Alice 103a. Rather, embodiments of the present invention may be performed by a computing device that is configured to perform some or all of the actions attributed to Alice 103a above. Equally, embodiments may be performed by a user operating a computing device running a client application that is configured to perform some or all of the actions attributed to Bob 103b above. It is also not excluded that embodiments may be performed by a party other than a user, e.g. a party operating a server comprising one or more physical server units, or even whole a data centre.

In some embodiments, a shared seed is generated by two or more users. The second user will be referred to below as Carl 103c. Note that all cases use readings from Alice 103a (and Carl 103c) that include liveness detection and not with saved images. The reading and processing for producing the binarization are preferably performed offline and not communicated between devices online. Therefore preferably no images are saved or transmitted at any time.

In general, the method comprises obtaining at least one biometric reading, and generating a seed based on the biometric features identified in the at least one biometric reading. In some examples, more than one biometric reading, each containing its own respective biometric features, may be used to generate the seed. A biometric reading refers to an observation, i.e. measurement, recording, etc. of a respective biometric characteristic. For instance, a biometric characteristic may be a fingerprint, an iris, a finger-vein pattern comprising at least one finger-vein, a wrist-vein pattern comprising at least one wrist-vein, a facial pattern, etc. As a particular example, a fingerprint can be "read" using a fingerprint scanner, e.g. embedded within a mobile device. Similarly, an iris can be read using an iris-scanner, or more generally an eye scanner.

Consider the case where the seed is to be generated, and therefore reconstructed, based on a single biometric characteristic, e.g. a fingerprint (note that the term "fingerprint" is used herein to also include thumbprints). Note that this is non-limiting, and the method applies generally to using multiple biometric characteristics.

It will be appreciated that the reconstruction reading is a different and subsequent reading compared to the generation reading, but of the same characteristic. The seed can be reconstructed many times, and each of these times, a new reading is taken that includes liveness detection. Therefore, at least one reading is taken at the generation step, and at least one reading is taken each time when the seed is reconstructed. Of course, more than one reading can be taken at the generation step, and more than one reading can be taken at each reconstruction, if more than one fingerprint is used, e.g. of a fingerprint and an iris, or fingerprints from different users for shared seeds/wallets, etc.

Alice 103a scans her fingerprint, e.g. using her mobile phone or laptop, where the scan is equipped with liveness detection. Alice 103a, or rather her device, identifies a reference alignment-frame for the fingerprint. The alignment-frame is overlaid over the fingerprint reading. The alignment-frame comprises a plurality of sections, i.e. divisions, sectors, etc. The reference frame may be defined using polar co-ordinates and the plurality of sections may form a polar-grid. Alternative reference frames and section shapes (rectangular, hexagonal, etc.) may be used. Some or all of the sections will include one or more biometric features, depending on their respective positions within the reading. That is, a given section may include one or more features, or a given section may not include any biometric features.

Note that whilst the following examples involve the use of an alignment-reference frame, such a reference frame is not essential. The skilled person will be familiar with other suitable techniques, e.g. alignment-free binarization.

Figure 3:
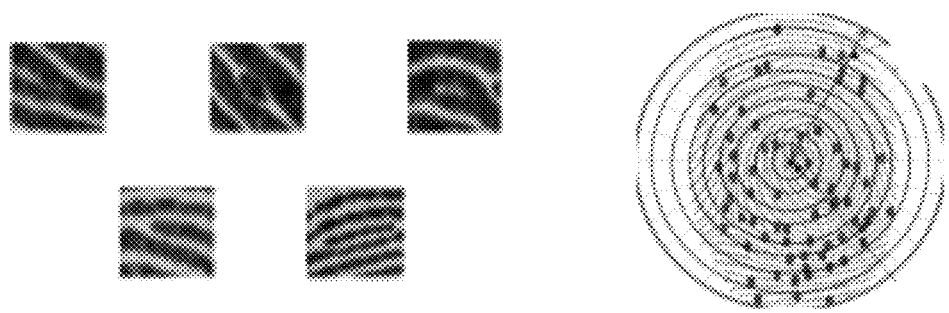
FIG. 3 illustrates example biometric features in a fingerprint (left-hand side) and an example identified alignment reference-frame for a fingerprint (right-hand side), FIG. 4 schematically illustrates an example alignment reference-frame, FIG. 5 schematically illustrates a binary representations corresponding to a biometric reading.
Figure 4:
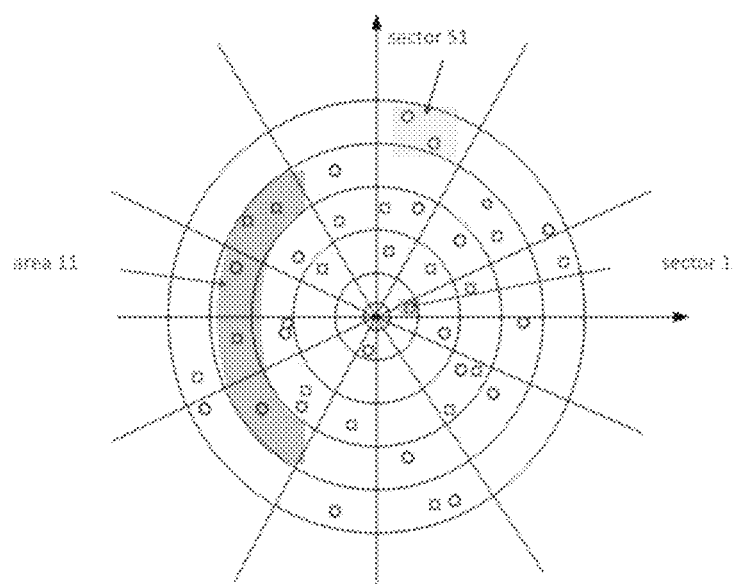

FIG. 3 illustrates example biometric features that may be present within a fingerprint, e.g. ridges, dots, enclosures, islands, etc. Also shown is an alignment reference-frame overlaid on a fingerprint. In this example, a section is part of a circular ring between concentric circles, and each such particular ring includes none, one or more features. FIG. 4 illustrates another example of an alignment-reference frame. In this example, several sections are concatenated into an area, i.e. several partial circular rings are merged into a larger partial circular ring. This is to say that areas are considered as main sections, and each main section consists of subsections. This is an example of restructuring that can further facilitate seed extraction, as explained later on.

Once the biometric features are identified, i.e. observed within the reading, each biometric feature is used to generate a respective first binary representation of that biometric feature. More specifically, a respective first binary representation is generated for each section of the alignment-frame, and those first binary representations are generated based on the biometric features, or lack thereof, within each section. For instance, and as will be discussed further below, a first binary representation may be generated based on a number and/or type of features within a given section. Other parameters of the sections may be used to generate the first binary representation.

Note that identifying the biometric features does not necessarily mean identifying each and every feature within a reading, though that is not excluded. For example, in some examples, only certain types of biometric features are identified, e.g. in FIG. 4 only two types of biometric features are identified. The types of features that are to be identified can be adapted without any loss of generality.

The collection of first binary representations (i.e. all of the first binary representations) are used to generate a second binary representation. In some instances, this may merely involve concatenating, or otherwise combining, the first binary representations. In other instances, as discussed below, further steps are applied to the first binary representations in order to generate the second binary representation.

Once the second binary representation has been generated, it is used to generate the seed. In some examples, the second binary representation is the seed. However, preferably the second binary representation undergoes further processing to generate the seed. The seed has therefore been generated based on the unique biometric features contained within the biometric reading, i.e. the fingerprint. Therefore only the same fingerprint can be used to reconstruct the seed if needed. Unlike conventional techniques, Alice 103a is not required to remember or store the seed. Rather, Alice 103a carries all of the information needed for reconstructing the seed with her at all times in the form of her fingerprint.

Returning to the alignment-reference frame, the present invention may involve the use of a process known as "aligned biometric binarization" to convert a biometric reading into the first binary representations. Binarization techniques are an important part of any algorithm and software that use physiological characteristics. A physiological characteristic, such as a fingerprint, comprises a large set of biometric features, such as the ones presented in FIG. 3. The binarization techniques are aligned or alignment-free. Aligned techniques translate biometric features into binary strings using a single frame of reference within the physiological characteristic. Aligned techniques start with recognising the reference alignment-frame in an observation of the physiological (i.e. biometric) characteristic, and then continue with recognising the pattern of biometric features in reference to that frame. Such techniques recognise the same alignment frame in different observations, with high accuracy. Thus, they recognise with high accuracy the same pattern of features in reference to that frame, in different readings of the same physiological characteristic. Such techniques depend on the accuracy of frame-alignment algorithms and pattern-recognition algorithms.

In addition, feature patterns are naturally slightly different in different observation of a physiological characteristic that belongs to the same user. In order to reduce the dependence on the accuracy of frame-alignment and pattern-recognition algorithms, and to account for slight differences in different observation, the last step in aligned binarization may involve the use of error correction codes and ECC decoding, as will be discussed below. Note however that such encoding is not essential.

Physiological characteristics include fingerprints, finger-veins, wrist-vein patterns, iris-colour shapes, facial patterns. Aligned binarization can be used to recognise features within these and other biometric characteristics. Fingerprints are used as a representative physiological characteristic below. Aligned binarization starts with recognizing minutia biometric features and identifying their alignment.

A fingerprint comprises numerous minutiae of different type. FIG. 3 (LHS) presents different types of fingerprint minutia. FIG. 3 (RHS) visualises positions of numerous minutiae in a fingerprint in reference to a central polar grid as a reference frame. The existence of various and numerous minutia features, and various reference frames, supports reusability of fingerprints (and other physiological characteristics) in binarization for different applications. Different applications can use binarization based on different types of minutia from the same fingerprint, and/or based on different reference frames.

The reference frame in FIG. 3 is an example for producing an aligned multisector binarization. The central point and the 0-angle orientation of a reference polar grid are identified first. Then, the number of concentric circles and the number of polar-angle divisions of $2\pi$ are selected according to the targeted number and size of sectors in the polar grid. The size of extracted entropy depends on the size and number of sectors. Consider the central polar grid in FIG. 4. It includes 5 circles and partitions $2\pi$ into 12 polar angles, producing 60 sectors. The sectors are ordered starting from the inner most circle and 0-angle orientation, and moving counter-clockwise and outwards. Thus, sector 1 is that shaded in the centre of the diagram, and sector 51 is the one shaded at the top of the diagram.

A binary substring (i.e. the "first binary representation") is extracted from each sector, and then all substrings are concatenated following the order of sectors, e.g. to form the "second binary representation". The table below presents a binarization example, where a sector-substring includes three parts. The first part corresponds to the overall count of observed minutiae in the sector ($1^{st}$ and $2^{nd}$ columns in the table). The second part corresponds to the combination of different minutia types in that sector ($3^{rd}$ and $4^{th}$ columns). The third part corresponds to minutia directions ($5^{th}$ to $8^{th}$ columns).

More generally, the first binary representation for any given section may be based on one or more of a respective number, position, types, direction, etc. of the biometric features within that section. In some examples, each section may be sub-divided into smaller sub-sections, and the binary representations may be based on one, some or all of the number, position, types, direction, etc. of biometric features within those sub-sections.

As shown in the table, the descriptors of a given section may be used to generate a respective third binary representation. Each third binary representation may be mapped to a value of a particular descriptor. For instance, as shown in the table below, a zero count of features within a section is mapped to a binary encoding of 000, whereas a one count is mapped to 001. The third binary representations generated for a given section may be concatenated or otherwise combined to form the first binary representation of that section. In other words, a respective set of third binary representation may be generated for each section of the alignment-frame, and then a respective first binary representation may be generated from that set.

| count of minutiae | binary encoding | types of minutia | binary encoding | minutia directions $D_{ij}$ | | binary encoding | |
|---|---|---|---|---|---|---|---|
| zero | 000 | 0 of type I, 0000 | | | | 0000 | 0000 |
| | | 0 of type II | | | | | |
| one | 001 | 1 of type I, 0001 | | $D_{Ia} = 1$ | | 0001 | 0000 |
| | | 0 of type II | | $D_{Ia} = 2$ | | 0011 | 0000 |
| | | | | $D_{Ia} = 3$ | | 0111 | 0000 |
| two | on | 2 of type I, 0101 | | $D_{Ia} = 1$ | $D_{Ib} = 1$ | 0001 | 0001 |
| | | 0 of type II | | | $D_{Ib} = 2$ | 0001 | 0011 |
| | | | | | $D_{Ib} = 3$ | 0001 | 0111 |
| | | | | $D_{Ia} = 2$ | $D_{Ib} = 2$ | 0011 | 0011 |
| | | | | | $D_{Ib} = 3$ | 0011 | 0111 |
| | | | | $D_{Ia} = 3$ | $D_{Ib} = 3$ | 0111 | 0111 |
| one | 001 | 0 of type I, 1000 | | $D_{IIa} = 1$ | | 0000 | 0010 |
| | | 1 of type II | | $D_{IIa} = 2$ | | 0000 | 0110 |
| | | | | $D_{IIa} = 3$ | | 0000 | 1110 |
| two | 011 | 1 of type I, 1001 | | $D_{Ia} = 1$ | $D_{IIa} = 1$ | 0001 | 0010 |
| | | 1 of type II | | | $D_{IIa} = 2$ | 0001 | 0110 |
| | | | | | $D_{IIa} = 3$ | 0001 | 1110 |
| | | | | $D_{Ia} = 2$ | $D_{IIa} = 2$ | 0011 | 0110 |
| | | | | | $D_{IIa} = 3$ | 0011 | 1110 |
| | | | | $D_{Ia} = 3$ | $D_{IIa} = 3$ | 0111 | 1110 |
| | | | | $D_{Ia} = 1$ | $D_{Ia} = 1$ | 0010 | 0001 |
| | | | | | $D_{Ia} = 2$ | 0010 | 0011 |
| | | | | | $D_{Ia} = 3$ | 0010 | 0111 |

| count of minutiae | binary encoding | types of binary minutia | binary encoding | minutia directions $D_{ij}$ | | binary encoding | |
|---|---|---|---|---|---|---|---|
| | | | | $D_{Ia} = 2$ | $D_{Ia} = 2$ 0110 | 0011 |
| | | | | | $D_{Ia} = 3$ 0110 | 0111 |
| | | | | $D_{IIa} = 3$ | $D_{Ia} = 3$ 1110 | 0111 |
| | | 0 of type I | 1010 | $D_{IIa} = 1$ | $D_{IIb} = 1$ 0010 | 0010 |
| | | 2 of type II | | | $D_{IIb} = 2$ 0010 | 0110 |
| | | | | | $D_{IIb} = 3$ 0010 | 1110 |
| | | | | $D_{IIa} = 2$ | $D_{IIb} = 2$ 0110 | 0110 |
| | | | | | $D_{IIb} = 3$ 0110 | 1110 |
| | | | | $D_{IIa} = 3$ | $D_{IIb} = 3$ 1110 | 1110 |
| 3 or more | 111 | | 1111 | | | 1111 | 1111 |

As stated above, each first binary representation is used to generate a second binary representation. That is, the individual sections undergo binarization, and the resulting binary representations are used (e.g. concatenated) to produce a second binary representation reflecting the fingerprint as a whole.

In some examples, each of the first binary representations may be generated using Gray Code encoding. Gray Code encoding is also sometimes referred to as reflected binary code encoding, or simply reflected binary encoding. Note that these are merely examples of a particular set of encoding algorithms that be may be used for the same purpose. That is, more generally the first representations may be generated using an encoding algorithm that is configured to preserve physical differences among the biometric features when converting to a binary representation.

Referring to the table above, all three parts (count, type, direction) use Gray Code (GC) encoding, where the extent of physical difference/similarity among minutia patterns is preserved by larger/smaller Hamming distances d among their binary representations. The Hamming distance between two binary strings of equal length is the number of bits in which they differ. Thus, neighbouring count options have d=1, while d=2 and d=3 for more- and most-distant count options, correspondingly, e.g. as the $2^{nd}$ column shows. GC encoding is analogously used in the encoding of minutia types and directions in the table. With regard to notations, $D_{ij}$ stands for a minutia direction in a sector, where $i \in \{I, II\}$ denotes whether this is the direction of minutia of type I or type II. The index $j \in \{a, b\}$ denotes if this is the first or the second minutia of the same type encountered counter-clockwise in the sector. A sector is divided counter-clockwise into three equal polar angles, and the three directions $D_{ij} \in \{'1', '2', '3'\}$ correspond to a minutia position in one of the three resultants sub-sectors.

This particular example of binarization produces a 15-bit binary string for each sector from FIG. 4. For example, sector 51 is represented with the string $B_{sector,51}$=011010100110111. Then the binary strings corresponding to the 60 sectors are concatenated from $B_{sector,1}$ to $B_{sector,60}$ to produce a 900-bit representation B= $B_{sector,1} \| \ldots \| B_{sector,60}$ for the fingerprint. This is visualised in FIG. 5.

Note that each sector is translated into one of the $32=2^5$ possible 15-bit strings from the table above. Thus a fingerprint is binarized into one of the corresponding $(2^5)^{60}=2^{300}$ possible strings of 900-bit length. If such string is considered as the extracted seed, then the source set for the seed is of size $2^{300}$ not $2^{900}$. Note further that dividing the fingerprint into sectors is equivalent to dividing a long binary string into substrings of equal length. This resembles the division in BIP39, where an initial binary string of 128- to 256-bit length is partitioned into 11-bit substrings. Indeed, the binarization of each sector can be associated with a word from a dictionary. However, now 15-bit substrings are associated with a dictionary of $2^5$ words, instead of 11-bit substrings being associated with a dictionary of $2^{11}$ words. In order to increase the dictionary size in fingerprint binarization, several sectors can be concatenated into one larger sector (area). Thus, when each four consecutive sectors in FIG. 4 are merged into an area, there are 15 areas in the polar grid. So area 11 in the figure consists of sectors 41 to 44, and its 60-bit binarization is:

$$B_{area,11} = 011101001101110 \| 001000100010000 \| 001100000000010 \| 001000100110000$$

The source set for an area is of size $(2^5)^4=2^{20}$ and can be associated with a dictionary of $2^{20}$ words. Concatenating the 15 areas, still produces the fingerprint binarization as a 900-bit string, and the size of the source set (source space) for the seed is still $2^{300}=(2^{20})^{15}$. The fingerprint can be binarized into a longer string if the number of concentric circles in the polar grid is increased, or the number of angles that $2\pi$ is partitioned into is increased, or the number of possible directions in a sector is increased. This not only increases the number of sectors and the number of corresponding areas, but also increases the size of the source space for the seed. The entropy of the extracted seed increases with increasing the size of the seed's source space.

The second binary representation may be used as the seed. Alternatively, the second binary representation may be decoded into a set of codewords, where the codewords form the seed. For instance, the second binary representation may be divided into numerous sub-strings, each sub-string mapping to a respective codeword.

Preferably, one or more decoding algorithms are applied to the second binary representation to produce the codewords. In some embodiments, a first error correction decoding algorithm is applied to the second binary representation which is configured to correct for one or more (but still only few) erroneous bits within each of the first binary representations. The first error correction decoding algorithm provides robustness for generating seeds from the same user, where some features may appear slightly different in subsequent readings, e.g. due to stretching of the skin. That is, the first decoding algorithm corrects for differences within the same sector (area). The first decoding algorithm converts the second binary representation into an intermediate set of codewords. Note that if no further decoding algorithms are applied, the intermediate set of codewords is the final set of codewords, which will be discussed below. An example of a first decoding algorithm is a Binary Bose-Chaudhuri-Hocquenghem decoding algorithm, described below.

A second error correction decoding algorithm may also be applied to the intermediate set of codewords to generate a final set of codewords. The second decoding algorithm is configured to correct whole sectors (areas), e.g. to correct one or more (but still very few) erroneous sectors or areas. This provides robustness towards occasional smudging of a sector (area) in different readings of the same fingerprint. An example of a second decoding algorithm is a Reed-Solomon decoding algorithm, described below.

In more detail, aligned binarization depends on the accuracy of frame-identification algorithms and minutia pattern-recognition algorithms. In addition, minutia patterns are naturally slightly different in different observation of a physiological characteristic that belongs to the same user. In order to reduce the dependence on the algorithm accuracy and to account for slight differences in observation, the last step in aligned binarization may use error correction codes and ECC decoding. Such decoding reduces the size of the source space for the extracted seed, and so reduces seed entropy. But this can be compensated for by using an alignment frame that is divided into a larger number of sectors, or when including more minutia types in the binarization of sectors, or using concatenated sectors or areas from more than one fingerprint of the same user (or of different users in case of shared seeds and shared wallets).

Bose-Chaudhuri-Hocquenghem Codes

A Binary Bose-Chaudhuri-Hocquenghem (BBCH) code is defined as follows:

Definition 1. Binary Bose-Chaudhuri-Hocquenghem

Let $m \geq 3$ and t be positive integers. There exists a BBCH code such that:
  its codeword bit-length is $n=2^m-1$;
  its number of information bits is r;
  its correctable number of erroneous bits is t;
  its number of parity-check bits is $n-r \leq mt$;
  its minimum distance among codewords is $d_{min}=2t+1$;
  the primitive element of $GF(2^m)$ it uses is $\alpha$;
  the binary generator polynomial is $g(Y)$;
  $g(Y)$ is the lowest degree polynomial having roots $\alpha, \alpha^2, \ldots, \alpha^{2t}$.

A BBCH code is denoted with the tuple (n, r, t), where parameters r and t are known a priory, and parameters n, m, $d_{min}$ are selected so that the conditions in Definition 1 are met. The code generator is a binary polynomial $g(X)$ specified in terms of its roots from the extension field $GF(2^m)$.

There are $2^r$ codewords in a BBCH code (n, r, t). Let an r-bit string $R_i$ be encoded into a codeword string $C_{BCH,i}$ of length $n>r, 1 \leq i \leq 2^r$. Let up to t bits of $C_{BCH,i}$ be randomly corrupted, so that an erroneous word $C_{BCH,i}^\varepsilon=(C_{BCH,i}+\varepsilon_i)$ is produced, where $\varepsilon_i$ is the error string, $1 \leq i \leq 2^r$. The Hamming weight co of error string $\varepsilon_i$ is therefore $\omega(\varepsilon_i) \leq t$. Hamming weight is the number of bits valued '1' in a binary string. The code guarantees correcting (decoding) $C_{BCH,i}^\varepsilon$ back to $C_{BCH,i}$. The code can also probabilistically decode $C_{BCH,i}^\varepsilon$ for $\omega(\varepsilon_i) > t$, where the probability of decoding reduces with the increase of error weight $\omega(\varepsilon_i)$. Parameter t is termed "random-error-correcting capability" of the BBCH code, where the code is instantiated with a minimum Hamming distance among its codewords, $$d_{min}(C_{BCH,i}, C_{BCH,j})=(2t+1), 1 \leq i,j \leq 2^r.$$

Consider binarization $B_{area,11}$ of area 11 from FIG. 4. Any time the same fingerprint is observed, the binary string $B_{area,11}$ may be slightly different. Therefore, this string can be considered as an erroneous codeword $C_{area,11}^\varepsilon$ in a BBCH code. The bit-length of $B_{area,11}$ is related to parameter n in the code. Parameter t relates to an approximation of the effect of framework-alignment and minutia-recognition accuracy and the effect of slight natural differences in readings of the same fingerprint. Let this parameter be approximated as $\tilde{t}=2$. Then, BBCH tables show that the code with parameters nearest to the approximated $\tilde{n}=60$ and $\tilde{t}=2$ is the code (n=63, r=51, t=2). Padding $B_{area,11}$ with three zero-bits produces a corresponding erroneous codeword $C_{area,11}^\varepsilon=B_{area,11}\|000$ for code (63, 51, 2). The erroneous $C_{area,11}^\varepsilon$ can be decoded into the codeword $C_{area,11}$ as follows:

$C_{area,11}$=011101001101110001000100010000001100000000011001000

C Note that the extracted seed is now $S_{BCH}=C_{BCH}=C_{area,1}\|\ldots\|C_{area,15}$ not $S=B=B_{area,1}\|\ldots\|B_{area,15}$, and the bit-length of $S_{BCH}$ is 945 instead of the 900-bit S. Importantly, decoding reduces the size of the source space for the seed. That size for B is $2^{300}=(2^{20})^{15}$; and for $C_{BCH}$, it can reach as low as $2^{120}=(2^8)^{15}=(2^{20+51-63})^{15}=(2^{20+r-n})^{15}$. Therefore, to achieve a source-space size of $2^{256}$, the number of areas in the reference polar grid has to be increased from 15 to 32, which is equivalent to increasing the number of sectors from 60 to 128.

Reed-Solomon Codes

The BBCH codes are binary. In, q-ary codes where q>2 is an integer, generating the codes involves primitive elements of $GF(q^m)$ instead of $GF(2^m)$. Particularly, Reed-Solomon (RS) are a subclass of q-ary codes where m=1, $q=2^{m_{RS}}$, and $m_{RS}$ is the bit-length of a symbol in the RS codewords.

Definition 2. Parameters in Read-Solomon codes:

Let $m_{RS} \geq 3$ and $t_{RS}$ be positive integers. There exists an RS code such that:
  its symbol bit-length is $m_{RS}$;
  its codeword length in symbols and in bits is, respectively, $n_{RS}=2^{m_{RS}}-1$ and $n_{RS}m_{RS}$;
  its number of information symbols and corresponding number of information bits are, respectively, $r_{RS}$ and $r_{RS}m_{RS}$;
  its correctable number of erroneous symbols and corresponding number of erroneous bits are, respectively, $t_{RS}$ and $t_{RS}m_{RS}$;
  its number of parity-check symbols and corresponding parity-check bits is $n_{RS}-r_{RS}=2t_{RS}$ and $2m_{RS}t_{RS}$;
  its minimum distance among codewords, in symbols and in bits, is respectively,
  $d_{RS}=2t_{RS}+1$ and $d_{RS}m_{RS}$.

An RS code corrects up to $t_{RS}$ symbols in an RS codeword, irrespectively of how many bits in these symbols are erroneous. Thus, RS codes are more effective against clustered/burst errors than BBCH codes are. In the context of fingerprint binarization, parameter $\tilde{t}$ from above is an approximation, and the Hamming distance among BBCH codewords $d(C_{BCH,i}, C_{BCH,j})$ varies though its minimum is $d_{min} \geq 2\tilde{t}+1$. Due to these two reasons, some erroneous codeword $C_{area,i}^\varepsilon, 1 \leq i \leq 15$, will differ more than $\tilde{t}$ bits from BBCH codewords $C_{area,i}$, and may not be corrected. Particularly, when a distortion of an area in the fingerprint occurs, this can be considered as a burst error in aligned binarization. Let us denote the parameters of a BBCH code with the subscript BCH, and the parameters of an RS code with the subscript RS. Let a BBCH code and an RS code be chained, so that BBCH is the inner code and RS is the outer code. The BBCH code corrects random errors of up to $t_{BCH}$ bits in any erroneous codeword of bit-length $n_{BCH}$. The RS code corrects up to $t_{RS}$ symbols of bit-length $m_{RS}=n_{BCH}$ in any codeword of symbol-length $n_{RS}$, which is equivalent to a bit-length of $n_{RS}m_{RS}=n_{RS}n_{BCH}$. Then, we can allow for no more than $\tilde{t}_{BCH}$ error-bits in a binarized area $B_{area,i}$ of a fingerprint, and for no more than $\tilde{t}_{RS}$ areas in the fingerprint to have more than $\tilde{t}_{BCH}$ error-bits each.

From the example above, we use the BCH bit-parameters $\tilde{n}_{BCH}=60$, $\tilde{t}_{BCH}=2$, ($n_{BCH}=63$, $r_{BCH}=51$, $t_{BCH}=2$). We also select an approximation $t_{RS}=2$ areas, and consider that there are $\tilde{n}_{RS}=15$ areas in the example reference polar grid. Then, the relevant RS code is ($n_{RS}=15$, $r_{RS}=11$, $t_{RS}=2$), where $r_{RS}=n_{RS}-2t_{RS}=15-4=11$, and the fingerprint is decoded into a codeword $C_{RS\_BCH}$. Note that the seed is now $C_{RS\_BCH}$; and the size of its source space is further reduced from $(2^8)^{15}$ to $(2^8)^{11}$. Thus, applying the chained BBCH and RS error correction codes reduces the size of source-space, from $2^{300}$ for S=B to $2^{88}$ for $S_{RS\_BCH}$. Seed entropy reduces about 3.5 times.

Regardless of whether or not the decoding algorithm(s) is applied to the second binary representation to generate the seed, the seed may then be used to generate one or more private keys. For instance, the seed may be used to derive a master private key, which may then be used to derive one or more additional private keys. For example, the seed may be used as a seed for generating a HD wallet. One or more of the private keys may be used to generate a signature on a message, e.g. to sign one or more inputs and/or outputs of a blockchain transaction. For instance, a derived private key may be used to sign a transaction as described with reference to FIG. 2. Note that the message need not necessarily relate be a standard (P2PKH) blockchain-transaction, and instead the signature may be a signature of any data, e.g. a certificate or contract that is blockchain-facilitated or blockchain-enforced. Some of the derived keys or the derived shared keys can also be used to encrypt data recorded in outputs of blockchain transactions, following blockchain protocols for encryption and shared encryption.

Alice 103*a* may repeat the steps described above a later time in order to reconstruct the seed, e.g. to reconstruct the one or more private keys. That is, Alice 103*a* may scan her fingerprint, and in response, the alignment reference-frame is identified, a plurality of first binary representations are generated, which are then used to generate a second binary representation, and which is then used to reconstruct the seed.

In some embodiments, Alice 103*a* provides two or more biometric readings. A respective alignment-reference frame is identified for each reading, which is then used to generate a respective second binary representation. The respective second binary representations (one from each reading) are concatenated or otherwise combined to generate the seed. In some examples, the readings are of the same biometric characteristic, e.g. two or more fingerprints. In other examples, different biometric characteristics may be used, e.g. fingerprint and iris, or fingerprint and facial pattern.

In some embodiments, both Alice 103*a* and another user, e.g. Carl 103*c* provide one or more respective biometric readings. This may be used to generate a shared seed, e.g. for generating shared private keys. In these instances, both Alice 103*a* and Carl 103*c* are required to provide their respective reading(s) in order to reconstruct the seed. In some examples, Alice 103*a* and Carl 103*c* may each generate a respective seed, with Alice 103*a* using her seed to generate one or more private keys of a HD key structure, and Carl 103*c* using his seed to generate the corresponding chain codes.

Note that in some examples, a given reading may be made up of several instances of the same reading. For example, Alice's same fingerprint may be scanned multiple times to improve the accuracy of the reading.

A bio-extracted seed is generated as an aligned binarization of a physiological characteristic (fingerprint). This approach achieves the dual-objective stated above to the extent that it is not necessary to memorise the seed, the seed is user-friendly to reproduce, there are less restrictions on the size of seed entropy, it is user-friendly to construct and reproduce a shared seed. The following provides a specific example for generating a bio-extracted seed. It will be appreciated that not all of the described features are essential for implementing all embodiments of the present invention.

The bio-extracted seed approach works particularly well with biometric readings that include liveness detection, in order to prevent presentation attacks. Presentation attacks are attacks where a dead finger or a moulded fingerprint or a fingerprint image is submitted to the scanner instead of a live finger. The bio-extracted seed approach also works with aligned binarization, as it does not require access to any parameters for performing the binarization. Aligned binarization implements consecutively several types of algorithms, starting with algorithms for reference-frame identification and alignment. Such algorithms for fingerprints are currently achieving high accuracy. These algorithms are followed by techniques for recognition of minutia biometric features and of minutiae patterns. AI-based such techniques are already achieving significantly high accuracy. This is indicated in results on the leader-boards for these techniques, as reported in the ongoing accuracy and speed evaluation by the U.S. National Institute of Standards and Technology.

Figure 5:
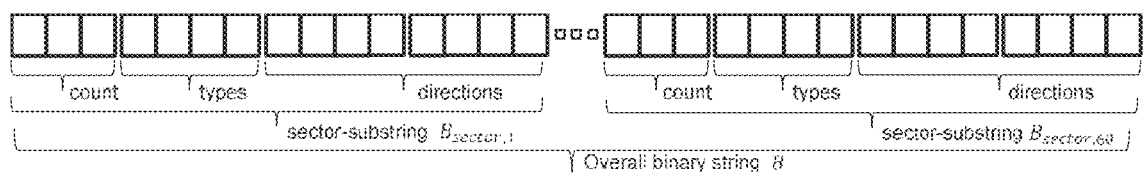

Once minutia features and patterns in a live reading of a fingerprint are recognised, binary encoding is performed so that the extent of physical difference or similarity among minutia patterns are preserved. Gray Code (GC) encoding may be used for this purpose. Physically more different or more similar minutia patterns are encoded into binary strings, with larger or smaller Hamming distances between them, respectively. Furthermore, aligned binarization works with fingerprint division in sectors, in order to produce longer binary strings by concatenating sector-substrings. FIG. 5 shows how a 15-bit sector-substring $B_{sector,i}$ can include information about the count, types, and directions of minutiae recognised in sector i.

The initial binarization (i.e. the "second binary representation") of the fingerprint is the concatenation B= $B_{sector,1}\|\ldots\|B_{sector,N_{sector}}$, where $N_{sector}$ is the number of sectors in the applied fingerprint division. If $N_{sector}$ is increased, then the length of B increases. Note that due to using distance-preserving encoding, such as GC, the source-space for the binary string B is smaller than its bit-length suggests. The table above shows how a 15-bit sector-encoding has a source-space size of $2^5$ rather than $2^{15}$. Thus, for a division in 60 sectors, the source-space for the initial fingerprint binarization is $(2^5)^{60}=2^{300}$; and for a division in 128 sectors, the source-space is $(2^5)^{128}=2^{640}$.

Therefore a fingerprint's biometric features can be recognised, aligned, and translated with high accuracy into a binary string B, where the string has a targeted size for its source-space. This size for the initial binarization B is proportionate to the size of the source-space for the final extracted seed S.

In order to produce a bio-extracted seed S from the initial binarization B, it may be necessary to account for slight natural differences in different live readings of the same fingerprint. This can be achieved with the use of ECC decoding. Such decoding also reduces the dependence of S on the accuracy of algorithms producing B. BBCH codes may be used for decoding a seed $S_{BCH}$ from B. This decoding is applied to sector binarizations $B_{sector,i}$ and produces codewords $C_{BCH,i}$. The codewords are then concatenated to produce the seed $S_{BCH}$.

BBCH decoding, however, reduces the size of the source-space for a decoded sector $C_{BCH,i}$ and for the seed $S_{BCH}$. It is why several sector-substrings are often concatenated into an area-substring prior to decoding into BCH codewords. Thus, when four 15-bit sector-substrings are concatenated into one 60-bit area-substring, the BCH code (n=63, r=51, t=2) can be applied. For example, $$B_{area,11}=011101001101110\|001000100010000\|001100000000010\|001000100110000$$

is the initial binarization of area 11 in FIG. 4, and it decodes into the BBCH codeword $$C_{area,11}=011101001101110001000100010000001100000000011001000.$$

For a 60-sector fingerprint division, the transition from sectors to areas leads to a 15-area fingerprint division. So the initial binarization $B=B_{sector}=B_{sector,1}\|\cdots\|B_{sector,60}$ is equivalently presented as $B=B_{area}=B_{area,1}\|\cdots\|B_{area,15}$, and the extracted seed is the concatenation of codewords $S_{BCH}=C_{BCH}=C_{area,1}\|\cdots\|C_{area,15}$.

ECC decoding reduces the size of the source-space and so reduces the entropy of the extracted seed. Thus, using BBCH code ($n_{BCH}$=63, $r_{BCH}$=51, $t_{BCH}$=2) reduces that size from $((2^5)^4)^{15}=2^{300}$ for initial binarization $B_{area}$ to $(((2^5)^4)2^{51}2^{-63})^{15}=2^{120}$ for extracted seed $S_{BCH}$. In order to achieve a source-space size of $2^{256}$ for $S_{BCH}$, the number of areas in fingerprint division has to be increased to 32. If the number of areas is increased beyond 32, then the size increases beyond $2^{256}$. This size increases further if the areas from two fingerprints are used and concatenated, or each area is binarized in more details and thus in a longer than a 60-bit string.

A BBCH decoding accounts for natural variations and inaccuracies of up to $t_{BCH}$ bits per $B_{area,i}$. If $\tilde{t}_{BCH}$ is the allowed or approximated bit-difference, then code ($n_{BCH}$, $r_{BCH}$,$t_{BCH}$=$\tilde{t}_{BCH}$) accounts for most cases. Thus, using code ($n_{BCH}$=63, $r_{BCH}$=51, $t_{BCH}$=2) accounts for up to 2-bit differences per area. The code can correct higher bit-differences only probabilistically. BBCH software toolboxes usually return the same string, if they cannot decode it into a codeword. As $\tilde{t}_{BCH}$ is an approximation rather than certainly known, and the Hamming distance between codewords $d(C_{BCH,i}, C_{BCH,j})$ is not always at its minimum $d_{min}=(2\tilde{t}_{BCH}+1)$, some erroneous codewords $B_{area,i}=C_{BCH,i}^\varepsilon$ differ in more than $\tilde{t}_{BCH}$ bits from codewords $C_{BCH,i}$.

The above issue is addressed by using chained ECC decoding, where an 'inner' BBCH decoding is followed by an 'outer' RS decoding. The latter corrects up to $t_{RS}$ symbols in an erroneous RS-codeword, irrespectively of how many bits in these symbols are erroneous. We consider RS decoding where the bit-length $m_{RS}$ of an RS symbol is equal to the bit-length of an (erroneous) BBCH codeword $C_{BCH,i}^{(\varepsilon)}$ that a binarized area $B_{area,i}$ has been represented with/decoded into. A number of concatenated (erroneous) BBCH codewords correspond to an erroneous RS codeword $C_{RS,i}^\varepsilon$. Thus, we allow for no more than $\tilde{t}_{BCH}$ error-bits in a binarized area $B_{area,i}$ of a fingerprint, and for no more than $\tilde{t}_{RS}$ areas in (a portion of) the fingerprint to have more than $\tilde{t}_{BCH}$ error-bits each.

Figure 6:
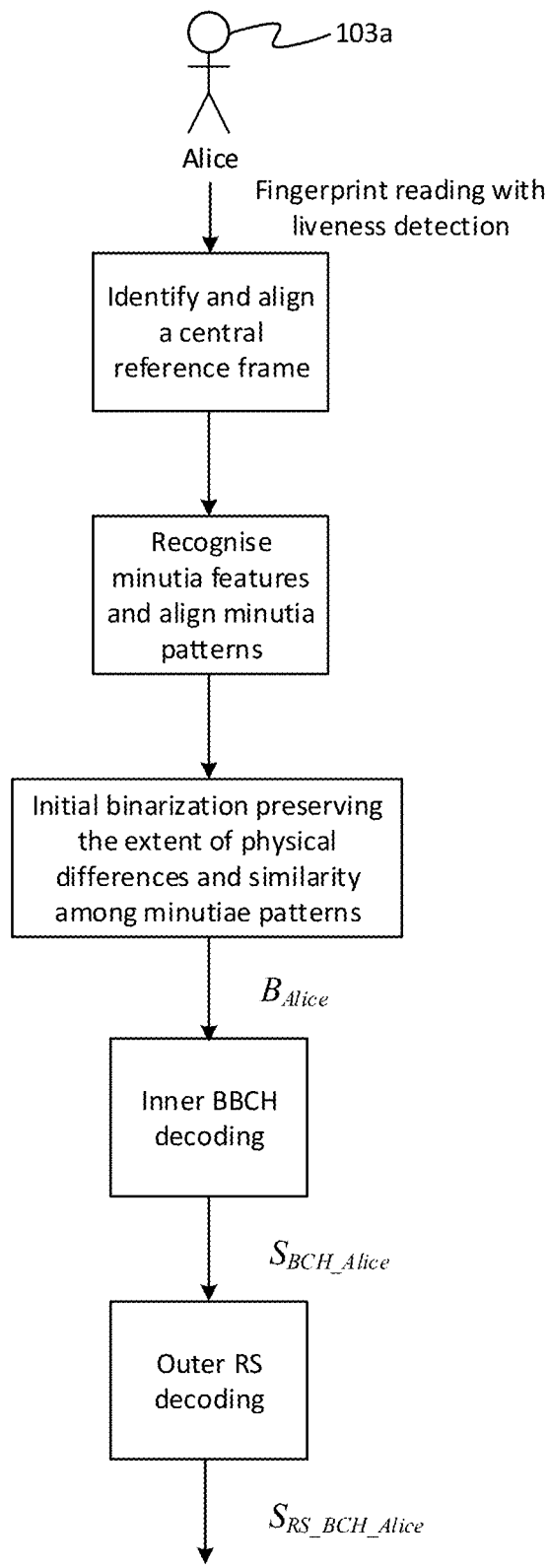
FIG. 6 is a flow diagram for generating a seed according to some embodiments of the present invention, FIG. 7 schematically illustrates a seed being used to derive private keys in accordance with some embodiments of the present invention.
Figure 7:
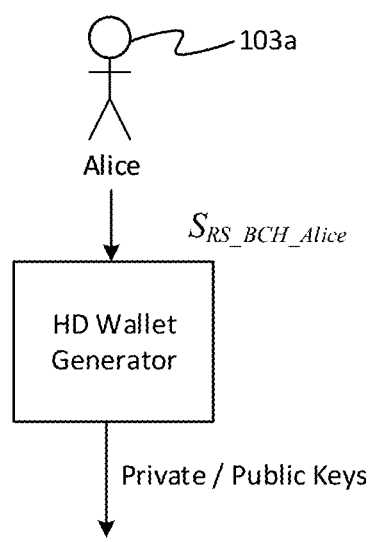

Thus the BBCH decoding that uses ($n_{BCH}$=63, $r_{BCH}$=51, $\tilde{t}_{BCH}$=2) can be followed by an RS decoding that uses code ($n_{RS}$=15, $r_{RS}$=11, $\tilde{t}_{RS}$=2). This allows for no more than 2 error-bits in a binarized area $B_{area,i}$ of a fingerprint comprising 15 areas, and for no more than 2 areas in the fingerprint to have more than 2 error-bits each. The extracted seed $S_{BCH\_RS}$ corresponds to one RS-codeword, and the size of the seed source-space reduces from $(2^8)^{15}=2^{120}$ for $S_{BCH}$ to $(2^8)^{11}=2^{88}$ for $S_{RS\_BCH}$. In order to achieve a source-space size above $2^{256}$, the number of areas in fingerprint division is increased from 15 to 45. This corresponds to an extracted seed $S_{RS\_BCH}$ of bit-length 2,835 that concatenates 3 RS-codewords, each of bit-length 63*15=945. FIG. 6 presents the steps in generating a bio-extracted seed $S_{RS\_BCH}$, and FIG. 7 visualizes feeding the bio-seed $S_{RS\_BCH}$ to the BIP32 algorithm at the point of generating the master key. Note that for bio-extracted seeds, seed generation and reconstruction are equivalent procedures.

Figure 8:
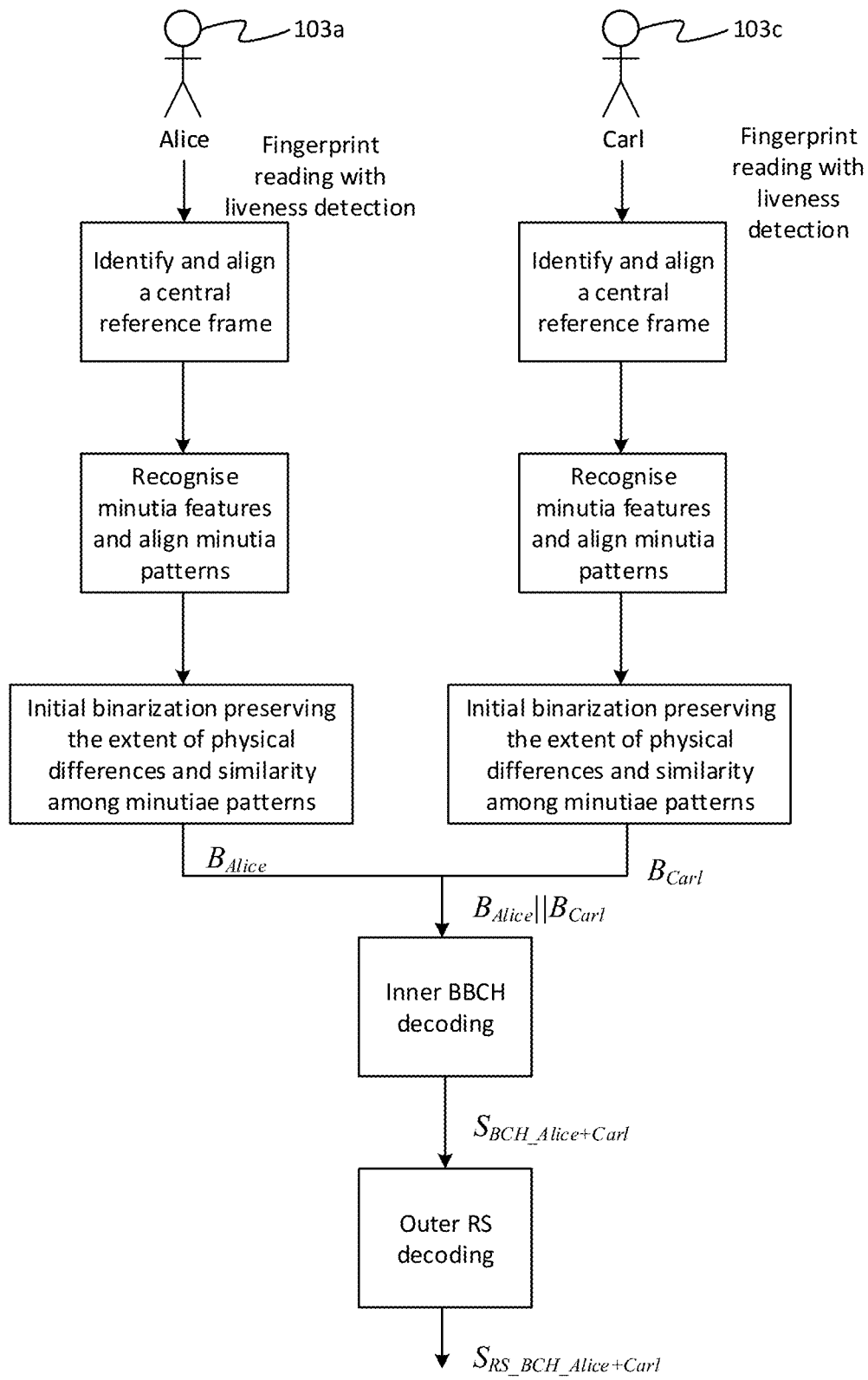
FIG. 8 is a flow diagram for generating a shared seed according to some embodiments of the present invention, and FIG. 9 schematically illustrates a shared seed being used to derive private keys in accordance with some embodiments of the present invention.
Figure 9:
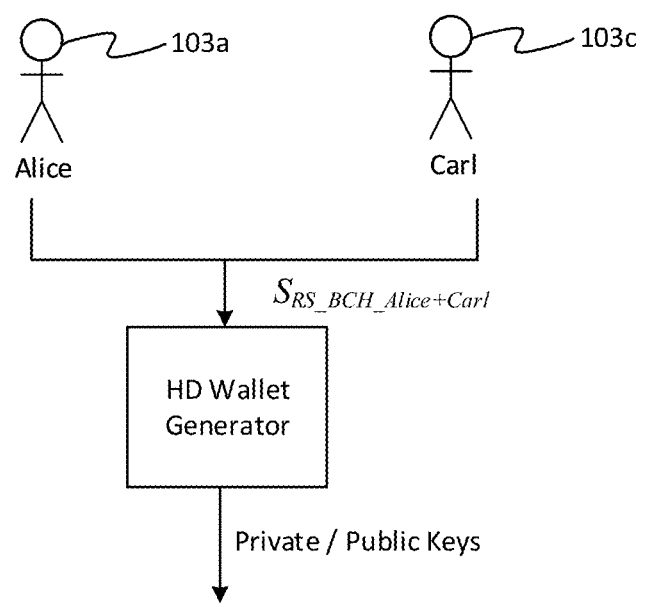

FIG. 8 presents the steps in generated a shared seed. Alice 103a and Carl 103c follow the same initial binarization steps to generate a respective second binary representation. Those second binary representations are then concatenated before undergoing optional further processing (e.g. inner decoding and outer decoding) to generate a shared seed. FIG. 9 shows the shared seed being used to generate a shared wallet.

A bio-extracted seed can be robustly generated, and a large size for its source space can be achieved. The source-space size of such seed corresponds logarithmically to the size of seed entropy. With regard to fingerprint entropy, the U.S. National Forensic Science Technology Centre (NFSTC) reports that no two people have ever been found to have the same fingerprints. Fingerprints form as a result of movements and positions of a foetus throughout pregnancy. Therefore, possible fingerprints exceed the number of people on Earth. Thus fingerprints are comparable to an PRNG source. Binarization algorithms and ECC algorithms affect the rate of entropy preservation. In the example, a bio-extracted seed of bit-length 2,835 has a source-space size of $2^{264}$ instead of $2^{2,835}$. Though there is a reduction in the entropy-perseveration rate, there is no restriction on increasing the size of the seed source space, as explained above. Once the source-space size of the bio-extracted seed is produced, it is logarithmically related to the bit-size of entropy of the bio-seed: the bit-size entropy of a bio-extracted seed is x when the size of the seed source-space is $2^{264}$. This is due to raw fingerprints being comparable to a PRNG source. Therefore, the size of seed entropy is less restricted in comparison to the indicated size in BIP32 and BIP39. The bio-extracted seed is also more user-friendly, both in terms of individual wallets and shared wallets.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of generating a seed for deriving one or more private keys, wherein the method comprises: obtaining one or more biometric readings; and for each of the one or more biometric readings: identifying a plurality of biometric features; generating a plurality of respective first binary representations, wherein at least some of the first binary representations are generated based on respective sets of the plurality of biometric features, and wherein the first binary representations preserves physical differences between the biometric features; and generating a respective second binary representation, each respective second binary representation being generated based on the respective first binary representations; wherein the method further comprises generating a seed based on the respective second binary representations.

Preferably, the biometric readings include liveness detection.

Each reading is of a respective biometric characteristic—fingerprint, iris, etc.—each characteristic comprising several features. The preference is on minutiae features that provide for reusability.

A pattern recognition algorithm is applied to each biometric reading to identify the respective set of biometric features.

Each first binary representation may be concatenated or alternatively combined to form a respective second binary representation. In other examples, each first binary representation undergoes further processing before generating a respective second binary representation.

In some examples, each second binary representation undergoes further processing before generating the seed, in order to provide for its robust reconstruction.

Obtaining the one or more biometric readings may comprise at least one respective readings from at least two different users, where the readings include liveness detection.

Statement 2. The method of statement 1, wherein said identifying of the respective sets of biometric features comprises identifying one or more types of biometric features.

Statement 3. The method of statement 1 or statement 2, comprising, for each of the one or more biometric readings: identifying a respective reference alignment-frame, the reference alignment-frame comprising a plurality of sections, wherein at least some of the plurality of sections comprise a respective set of the plurality of biometric features, and wherein each respective first binary representation is generated based on a respective one of the plurality of sections.

The reference frame may be defined as a polar-grid, or as other types of aligned frames.

Statement 4. The method of statement 3, wherein each of the respective first binary representations is generated based on at least one of the following descriptors:
- a respective number of biometric features in the respective section,
- a respective number of biometric features in a respective sub-section of the respective section,
- a respective position of each biometric feature in the respective section,
- a respective position of each biometric feature in the respective sub-section of the respective section,
- a respective type of each biometric feature in the respective section,
- a respective type of each biometric feature in the respective sub-section of the respective section,
- a respective direction of each biometric feature in the respective section,
- a respective direction of each biometric feature in the respective sub-section of the respective section, and/or
- a respective pattern of one or more biometric features in the respective section.

Statement 5. The method of statement 4, wherein each of the respective first binary representations is generated based on a plurality of third binary representations, each third binary representation being generated based on a different one of the descriptors.

For instance, each third binary representation may be concatenated to form a first binary representation.

Statement 6. The method of statement 4 or statement 5, wherein each of the respective first binary representations is generated using a distance-preserving encoding algorithm.

The distance-preserving encoding algorithm may be a Gray Code (GC) encoding algorithm. GC encoding is also sometimes referred to as reflected binary code encoding, or simply reflected binary encoding.

Statement 7. The method of any preceding statement, wherein said generating of the seed comprises decoding from each of the respective second binary representations to generate a final set of codewords, and wherein the seed is generated based on the final set of codewords.

For instance, the seed may be a concatenation of the final set of codewords.

Statement 8. The method of statement 7, wherein said decoding comprises applying a first error correction decoding algorithm to each of the respective second binary representations to generate an intermediate set of codewords, wherein the final set of codewords is generated based on the intermediate set of codewords.

Statement 9. The method of statement 8, wherein said first error correction decoding algorithm comprises a Binary Bose-Chaudhuri-Hocquenghem (BBCH) decoding algorithm, and wherein the intermediate set of codewords comprises a set of BBCH codewords.

Statement 10. The method of statement 8 or statement 9, wherein said decoding algorithm comprises applying a second error correction decoding algorithm to the intermediate set of codewords to generate the final set of codewords.

Statement 11. The method of statement 10, wherein said second error correction decoding algorithm comprises a Reed-Solomon (RS) decoding algorithm, and wherein the final set of codewords comprises a set of RS codewords.

Statement 12. The method of any preceding statement, comprising generating one or more private keys based on the generated seed.

Statement 13. The method of statement 12, wherein one of the generated private keys is a master private key, and wherein the method comprises generating one or more private keys of a hierarchical deterministic key structure.

Statement 14. The method of statement 12 or statement 13, comprising using at least one of the generated private keys to generate a signature based on a message.

Statement 15. The method of statement 14, wherein the message comprises at least part of a blockchain transaction.

Statement 16. The method of any of statements 12 to 14, comprising generating a respective public key corresponding to a respective one of the generated private keys, and using the respective public key to encrypt data within a blockchain transaction.

Statement 17. The method of any preceding statement, wherein said obtaining of the one or more biometric readings comprises obtaining multiple biometric readings.

Statement 18. The method of statement 17, wherein each of the multiple biometric readings is a biometric reading from a same user.

Statement 19. The method of statement 17, wherein at least two of the multiple biometric readings is a respective biometric reading from a different respective user.

The seed generated based on the biometric reading(s) from one user may be used to generate a master private key of a HD key structure, and the seed generated based on the biometric reading(s) from a different user may be used to generate a chain code for the keys of the HD key structure.

Statement 20. The method of any preceding statement, wherein the one or more biometric readings comprise one of more of:
a fingerprint reading,
an iris reading,
a finger-vein pattern reading,
a wrist-vein pattern reading,
a fingerpore pattern,
a skin-structure pattern, and/or
a facial pattern.

Statement 21. The method of any preceding statement, comprising: obtaining a second instance of the one or more biometric readings; and performing the method of any preceding statement to re-construct the seed.

Statement 22. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 1 to 21.

Statement 23. A computer program embodied on computer-readable storage and configured so as, when run on one or more processors, to perform the method of any of statements 1 to 21.

According to another aspect disclosed herein, there is provided a computer-implemented method of generating a seed for deriving one or more private keys, wherein the method comprises: obtaining one or more biometric readings; for each of the one or more biometric readings: identifying a respective reference alignment-frame, the reference alignment-frame comprising a plurality of sections, wherein at least some of the plurality of sections comprise a respective set of biometric features; generating a plurality of respective first binary representations, each respective first binary representation being generated based on a respective one of the plurality of sections, wherein the first binary representations preserves physical differences between the biometric features; and generating a respective second binary representation, each respective second binary representation being generated based on the respective first binary representations; and generating a seed based on the respective second binary representations.

The invention claimed is:

1. A computer-implemented method of generating a seed for deriving one or more private keys, wherein the method comprises:
   obtaining one or more biometric readings; and
   for each of the one or more biometric readings:
      identifying a plurality of biometric features;
      generating a plurality of respective first binary representations, wherein at least some of the first binary representations are generated based on respective sets of the plurality of biometric features, and wherein the first binary representations preserves physical differences between the biometric features; and
      generating a respective second binary representation, each respective second binary representation being generated based on the respective first binary representations;
   wherein the method further comprises:
   generating a seed based on the respective second binary representations; and
   generating one or more private keys based on the generated seed, wherein one of the generated private keys is a master private key, and wherein the method comprises generating one or more private keys of a hierarchical deterministic key structure.

2. The method of claim 1, wherein said identifying of the respective sets of biometric features comprises identifying one or more types of biometric features.

3. The method of claim 1, comprising, for each of the one or more biometric readings:
   identifying a respective reference alignment-frame, the reference alignment-frame comprising a plurality of sections, wherein at least some of the plurality of sections comprise a respective set of the plurality of biometric features, and wherein each respective first binary representation is generated based on a respective one of the plurality of sections.

4. The method of claim 3, wherein each of the respective first binary representations is generated based on at least one of the following descriptors:
   a respective number of biometric features in the respective section,
   a respective number of biometric features in a respective sub-section of the respective section, a respective position of each biometric feature in the respective section, a respective position of each biometric feature in the respective sub-section of the respective section, a respective type of each biometric feature in the respective section, a respective type of each biometric feature in the respective sub-section of the respective section, a respective direction of each biometric feature in the respective section, a respective direction of each biometric feature in the respective sub-section of the respective section, and/or a respective pattern of one or more biometric features in the respective section.

5. The method of claim 4, wherein each of the respective first binary representations is generated based on a plurality of third binary representations, each third binary representation being generated based on a different one of the descriptors.

6. The method of claim 4, wherein each of the respective first binary representations is generated using a distance-preserving encoding algorithm.

7. The method of claim 1, wherein said generating of the seed comprises decoding from each of the respective second binary representations to generate a final set of codewords, and wherein the seed is generated based on the final set of codewords.

8. The method of claim 7, wherein said decoding comprises applying a first error correction decoding algorithm to each of the respective second binary representations to generate an intermediate set of codewords, wherein the final set of codewords is generated based on the intermediate set of codewords.

9. The method of claim 8, wherein said first error correction decoding algorithm comprises a Binary Bose-Chaudhuri-Hocquenghem (BBCH) decoding algorithm, and wherein the intermediate set of codewords comprises a set of BBCH codewords.

10. The method of claim 8, wherein said decoding algorithm comprises applying a second error correction decoding algorithm to the intermediate set of codewords to generate the final set of codewords.

11. The method of claim 10, wherein said second error correction decoding algorithm comprises a Reed-Solomon (RS) decoding algorithm, and wherein the final set of codewords comprises a set of RS codewords.

12. The method of claim 1, wherein said obtaining of the one or more biometric readings comprises obtaining multiple biometric readings.

13. The method of claim 12, wherein each of the multiple biometric readings is a biometric reading from a same user, or wherein at least one of the multiple biometric readings is a respective biometric reading from a different respective user.

14. The method of claim 1, comprising using at least one of the generated private keys to generate a signature based on a message.

15. The method of claim 14, wherein the message comprises at least part of a blockchain transaction.

16. The method of claim 1, comprising generating a respective public key corresponding to a respective one of the generated private keys, and using the respective public key to encrypt data within a blockchain transaction.

17. Computer equipment comprising:

memory comprising one or more memory units; and processing apparatus comprising one or more processing units, wherein the memory stores code arranged to run on the processing apparatus, the code being configured so as when run on the processing apparatus, the processing apparatus performs a method of generating a seed for deriving one or more private keys, wherein the method comprises:

obtaining one or more biometric readings; and for each of the one or more biometric readings:

identifying a plurality of biometric features;

generating a plurality of respective first binary representations, wherein at least some of the first binary representations are generated based on respective sets of the plurality of biometric features, and wherein the first binary representations preserves physical differences between the biometric features; and generating a respective second binary representation, each respective second binary representation being generated based on the respective first binary representations;

wherein the method further comprises:

generating a seed based on the respective second binary representations; and generating one or more private keys based on the generated seed, wherein one of the generated private keys is a master private key, and wherein the method comprises generating one or more private keys of a hierarchical deterministic key structure.

18. A computer program embodied on a non-transitory computer-readable storage and configured so as, when run on one or more processors, the one or more processors perform a method of generating a seed for deriving one or more private keys, wherein the method comprises:

obtaining one or more biometric readings; and for each of the one or more biometric readings:

identifying a plurality of biometric features;

generating a plurality of respective first binary representations, wherein at least some of the first binary representations are generated based on respective sets of the plurality of biometric features, and wherein the first binary representations preserves physical differences between the biometric features; and generating a respective second binary representation, each respective second binary representation being generated based on the respective first binary representations;

wherein the method further comprises:

generating a seed based on the respective second binary representations; and generating one or more private keys based on the generated seed, wherein one of the generated private keys is a master private key, and wherein the method comprises generating one or more private keys of a hierarchical deterministic key structure.

* * * * *